United States Patent [19]

Suzuki

[11] Patent Number: 5,808,886
[45] Date of Patent: Sep. 15, 1998

[54] RECONFIGURING CONTROL SYSTEM IN A PARALLEL PROCESSING SYSTEM BY REPLACING AN ERROR-DETECTED PROCESSING UNIT

[75] Inventor: Kaoru Suzuki, Fujisawa, Japan

[73] Assignee: Hitachi, Ltd., Tokyo, Japan

[21] Appl. No.: 403,998

[22] Filed: Mar. 14, 1995

[30] Foreign Application Priority Data

Mar. 17, 1994 [JP] Japan .................................. 6-047245

[51] Int. Cl.⁶ .................................................. G05B 19/18
[52] U.S. Cl. ................... 364/133; 364/184; 395/182.02; 395/183.06
[58] Field of Search ................... 364/131–139, 364/184–187; 370/60, 94.1; 395/180, 181, 182.01, 182.02, 182.03, 182.05, 182.07, 182.08, 182.09, 183.01, 185.01, 200.2, 183.06, 183.07

[56] References Cited

U.S. PATENT DOCUMENTS

| | | | |
|---|---|---|---|
| 4,453,213 | 6/1984 | Romagosa | 371/16 |
| 4,484,326 | 11/1984 | Turner | 370/94 |
| 4,564,900 | 1/1986 | Smitt | 364/200 |
| 5,157,654 | 10/1992 | Cisneros | 370/94.1 |
| 5,166,926 | 11/1992 | Cisneros et al. | 370/60 |

*Primary Examiner*—Reba I. Elmore
*Assistant Examiner*—Thomas E. Brown
*Attorney, Agent, or Firm*—Jenner & Block

[57] ABSTRACT

A sender processor unit 101 transmits a packet to which a logical address of a receiver processor unit is added. Network routers 102 to 108 obtains a physical address corresponding to a destination logical address by referring to a processor address translation table 122 through a signal line 140, sets a route 112 and transfers the packet to a receiver processor unit 107. When a fault is caused in the receiver processor unit 107, a service processor changes correspondence of logical addresses to physical addresses of the processor address translation table 122. Consequently, a route 113 to a substitute processor unit 105 is dynamically

2 Claims, 6 Drawing Sheets

RECONFIGURING CONTROL SYSTEM IN A PARALLEL PROCESSING SYSTEM BY REPLACING AN ERROR-DETECTED PROCESSING UNIT

FIELD OF THE INVENTION

The present invention relates to a communication control method in a parallel processing system in which a plurality of processor units are connected with a network through network routers and data transfer between processor units is carried out by packet transmission and reception and, more particularly, a communication control method for a parallel processing system appropriate for efficiently implementing dynamic reconfiguration of the processor units.

BACKGROUND OF THE INVENTION

Various types of parallel processing machines such as, for example, SIMD (Single Instruction Stream Multiple Data Stream in which respective processors execute the same instruction for different data) and MIMD (Multiple Instruction Stream Multiple Data Stream in which respective processors independently execute discrete instructions) have been developed and practically used along with a limitation to speeding up of the operation of the single processor and a demand for higher speed processing of a huge volume of data. Generally, this type parallel processing system comprises several hundreds to several decades of thousands of processor units.

In the case that data transfer is carried out by transmission and reception of packets in such conventional parallel processing system as described above, a method has been used in which the processor units for transmission and reception are designated by using the physical network addresses to which the processor units are actually connected and the packet is transmitted and received between the transmission and reception processor units.

The above described prior art accompanies a problem that, in the case that a failure occurs in a processor unit during packet receiving operation or reception waiting operation and it will be necessary to disconnect a specified processor unit from the network, the OS (operating system) of the transmitter processor unit is required to restart the communication processing being carried out from the beginning by changing the network configuration information and using the changed physical network addresses after temporarily interrupting the task being processed to disconnect the processor units and completing reconfiguration and therefore the overhead of the OS increases and communication processing control will be complicated.

An object of the present invention is to provide a communication control method for a parallel processing system capable of solving the above-described problems of the prior art and quickly and efficiently implementing dynamic reconfiguration of the processor units as required.

SUMMARY OF THE INVENTION

To achieve the above-described object, the present invention is adapted so that, in a parallel processing system in which a plurality of processor units are connected by a network through respective network routers and data transfer between processor units is carried out by packet transmission and reception, a processor address translation table in which a correspondence between logical addresses and physical addresses of respective processor units is registered is provided in a monitor processor which monitors a condition of the system or respective network routers of a plurality of processor units, a packet sender processor unit sends a packet to which a logical address is added as an address of a destination processor unit, and a network router which receives the packet generates a request to the monitor processor to obtain a physical address corresponding to the logical address and selects a route of the network according to the physical address.

When it is necessary to disconnect, for example, a fault-detected processor unit from the network, the mating physical address of the logical address of the corresponding processor unit in the processor address translation table is translated to the physical address of the substitute processor unit. Thus disconnection of the fault-detected processor unit from the network can be achieved.

When a packet to which a logical address of the fault-detected processor unit is received in the network router, the physical address of the substitute processor unit is obtained from the processor address translation table and a route corresponding to the substitute processor unit is dynamically selected. For re-sending the packet, the sender processor unit can re-send the packet to which the logical address of the fault-detected processor unit is added as the address of a destination processor unit without consciousness of the substitute processor unit.

As described above, the present invention enables to facilitate software processing in reconfiguration and minimize the overhead of the OS. In addition, the present invention enables quick disconnection of the corresponding processor unit from the network and continuous execution of the task being processed.

PREFERRED EMBODIMENTS OF THE INVENTION

An embodiment of the present invention is described below in detail, referring to the accompanying drawings.

Figure 1:
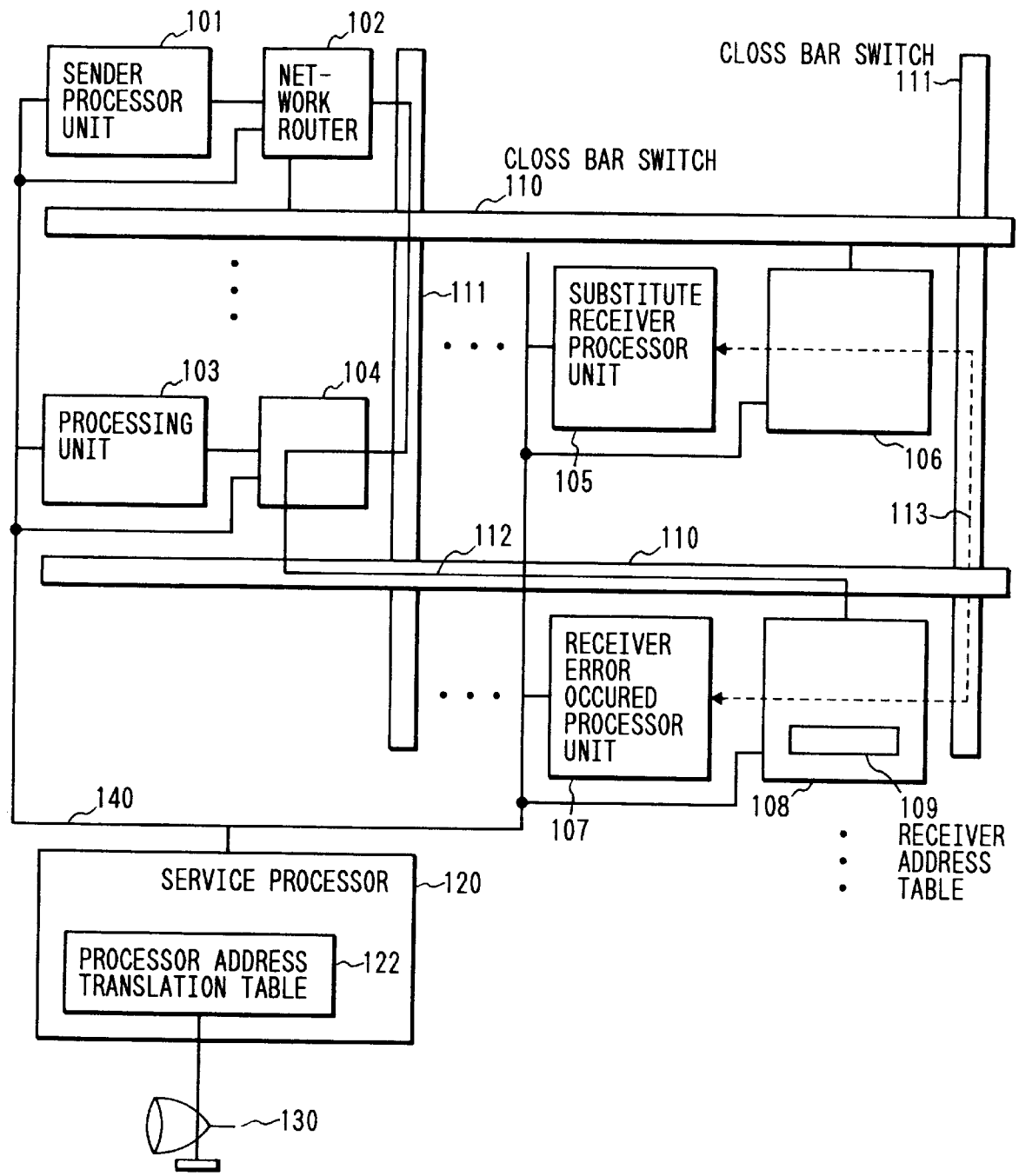
FIG. 1 is a block configuration diagram of a first embodiment of the present invention.

FIG. 1 is a block configuration diagram showing an embodiment of the present invention. In FIG. 1, reference numerals 101, 103, 105 and 107 respectively denote processor units, which are connected to X and Y crossbar switches 110 and 111, which comprises a network, through network routers 102, 104, 106 and 108 to form a parallel processing system. 109 is a receiver address table for temporarily holding a logical address of a sender processor unit in receiving a packet and, for convenience of explanation, this receiver address table is shown only for the network router 108 in FIG. 1 and is also provided for other network routers 102, 104 and 106. 120 is a service processor (network monitoring processor), which is connected to processor units 101, 103, 105 and 107 and network routers 102, 104, 106 and 108 through a signal line 140 for maintenance and diagnosis. 122 is a processor address translation table controlled by the service processor 120 and maintains the correspondence between virtual addresses (logical processor addresses) of processor units 101, 103, 105 and 107 and physical addresses (physical processor addresses) on the network. 130 is a system console by which an operator can set the contents of the processor address translation table 122.

Though the network comprises crossbar switches in X, Y and Z directions, only 2-dimensional crossbar switches for X and Y directions are shown in FIG. 1 to simplify the illustration. Though only four sets of processor units are shown, this type of parallel processing system comprises a number of processor units from several hundreds to several decades of thousands sets as described above.

Figure 4:
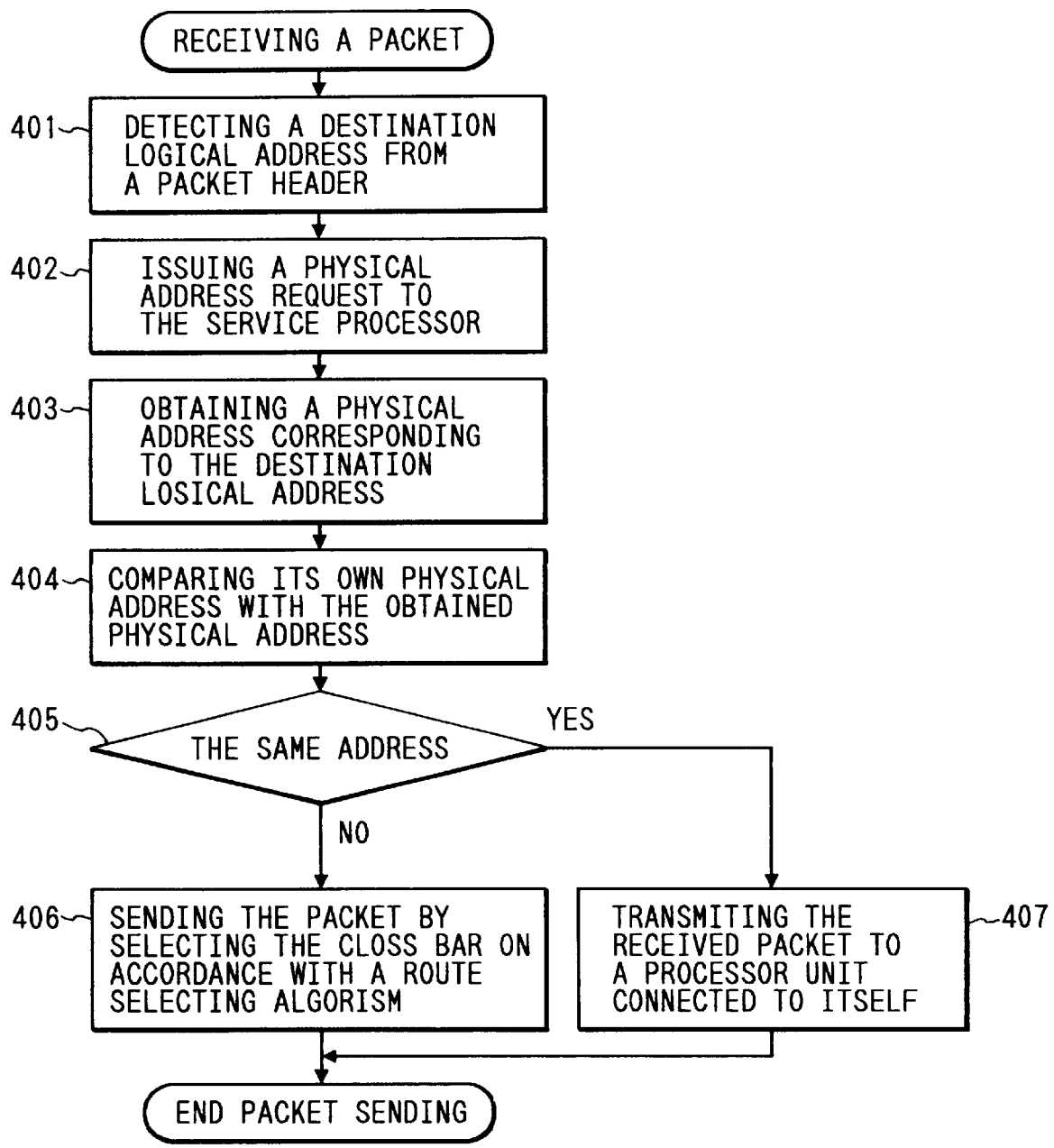
FIG. 4 is a processing flow chart when the network router receives a packet.

Data transfer between processor units is carried out by transmission and reception of the packet. Assuming the processor unit 101 as a sender and the processor unit 107 as a receiver, an operation in a case that the processor unit 107 is normal is described below. A processing flow chart of the network routers in this case is shown in FIG. 4.

In this case, for the purpose of convenience, the coordinate positions of the processor unit 101 and the network router 102 are assumed as the original points and the rightward direction is assumed as the X direction and the downward direction as the Y direction. Namely, the coordinates of the processor unit 101 and the network router 102 are (0, 0), the coordinates of the processor unit 103 and the network router 104 are (0, 1), the coordinates of the processor unit 105 and the network router 106 are (1, 0), and the coordinates of the processor unit 107 and the network router 108 are (1, 1). These coordinate values shall be used as the physical processor addresses of respective processor units.

The sender processor unit 101 transmits a packet to which the logical processor address (sender logical address) of the own processor unit and the logical processor address (destination logical address) of the receiver processor unit 107 are added to the header part. When the network router 102 receives this packet, the network router 102 reads out the destination logical address from the header part (step 401), issues a physical address obtention request to which the destination logical address is added to the service processor 120 through a signal line 140 (step 402), and obtains a physical address (destination physical address) corresponding to the destination logical address (step 403). Logical/physical address conversion operation according to the processor address conversion table 122 in the service processor 120 is described later referring to FIG. 2. The network router 102 compares the own address, that is, the physical address of the processor unit 101 and the destination logical address obtained (step 404) to determine whether or not these addresses are the same address (step 405), and selects a specified crossbar switch circuit according to a route selection algorithm and sends a packet since the addresses are not the same in this example (step 406). Specifically, the network router 102 obtains (1, 1) as the destination physical address from the service processor 120, compares its own physical address (0, 0) and the destination physical address (1, 1) and sends the packet in a direction of a difference thereof. In this case, it is assumed that the packet is sent by selecting the crossbar switch circuit 111 in the Y direction (the X direction can be, of course, selected according to the route selection algorithm). The packet is thus received by the network router 104.

The network router 104 which has received the packet similarly obtains the destination physical address (1, 1) from the service processor 120 and compares its own physical address (0, 1) and the destination physical address (1, 1). However, these addresses do not coincide and the network router 104 selects the crossbar switch circuit 112 in a direction of a difference thereof, that is, in the X direction in this case and sends the packet.

The packet thus transmitted by the processor unit 101 reaches the network router 108 through the route 112. When the network router 108 receives the packet, the network router 108 similarly obtains the destination physical address (1, 1) from the service processor 120 and compares it with its own physical address (1, 1). Consequently, these addresses coincide and the network router 108 sends the received packet to the own processor unit 107 (step 407). In this case, the network router 108 temporarily register the sender logical address added to the received packet in the receiver address table 109 and, when the received packet is normally fetched in the processor unit 107, the sender logical address is deleted. The details of this receiver address table 109 are described later referring to FIG. 3.

The following describes a case that a fault occurs in the receiver processor unit 107. When a fault occurs, the processor unit 107 informs a fault interrupt through the signal line 140. After freezing the system the service processor 120 rewrites the processor address translation table 122, changes the physical processor address corresponding to the logical processor address of the processor unit 107 and cancels freezing. In this case, it is assumed that the address is changed to the physical processor address (1, 0) of the processor unit 105.

If it is assumed that the packet transmitted by the processor unit 101 stays on the crossbar switch circuit between the network router 104 and the network router 108 while the system is being freezed, the packet reaches the network router 108 when the system is released from freezing. When the network router 108 receives a packet, the network router 108 similarly obtains the destination physical address from the service processor 120. In this case, the physical address (1, 0) of the processor unit (substitute receiver processor unit) 105 is returned as the destination physical address from the service processor 120. The network router 108 compares its own physical address (1, 1) and the destination physical address (1, 0) and, since these addresses do not coincide, the network router 108 selects a direction of a difference thereof, that is, the crossbar switch circuit 111 in the Y direction in this case, and sends the packet. Consequently, the packet is received by the network router 106 of the substitute receiver processor unit 105 on the route 113. The network router 106 similarly obtains the destination physical address (1, 0) and, since this address coincides with its own physical address (1, 0), fetches the received packet into the own processor unit 105.

Figure 2:
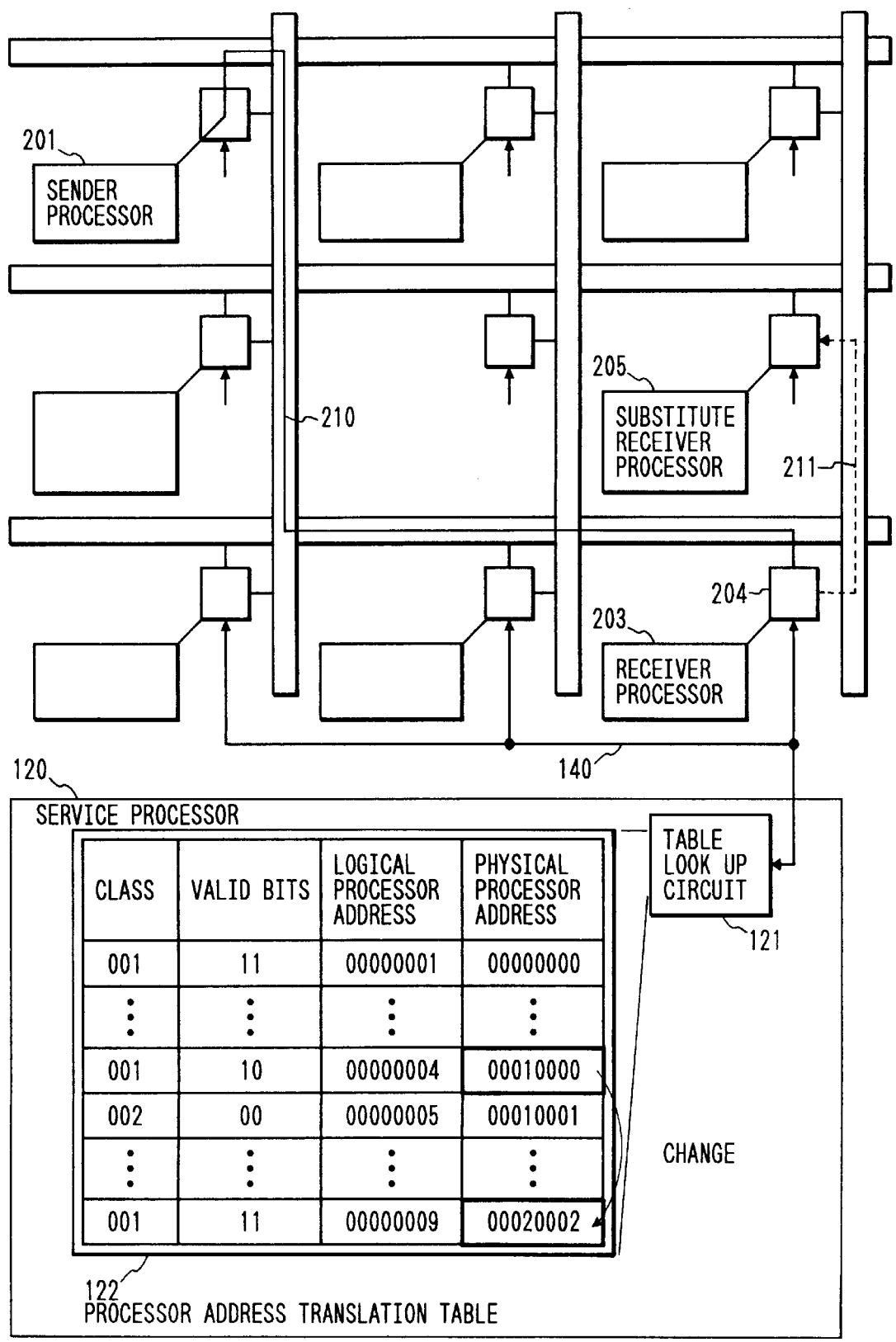
FIG. 2 is an illustration showing a configuration example of a processor address translation table and dynamic reconfiguration of network routines.

FIG. 2 is a diagram illustrating a typical configuration example of the processor address translation table 122 controlled by the service processor 120 and communication between processor units which use this processor address translation table and dynamic reconfiguration.

Similarly as described in FIG. 1, the packet sent from the sender processor unit 201 is transferred to the receiver processor unit 203 through the network router and the crossbar switch. In this case, the network routers respectively issue a request for obtaining the physical address corresponding to the destination logical address added to the header part of the packet to the service processor 120. In response to this request, the service processor 120 looks up the processor address translation table 122 through the table lookup circuit 121, reads out the physical address (physical processor address) corresponding to the destination logical address (logical processor address), and returns it to the requesting network router.

The entries of the processor address translation table 122 respectively comprise a class bit for designating a class of a processor group, a validity bit for determining the validity of the entry, a logical processor address and a physical processor address corresponding to a logical processor address. The processor address translation table 122 is initialized with a DIAG (diagnosis) instruction generated by the service processor 120 and, if a fault occurs, the table is automatically rewritten by the service processor 120 or according to a manual instruction entered from the system console 130.

The class bit has a serial number for each of processor unit groups which are grouped when the service processor 120 initializes the OS. For example, when a parallel processing system which comprises n sets of processor units is logically divided into two groups and operated, for example, class 001 is assigned to one processor group and class 002 is assigned to the other processor group. As the valid bit, "11" (in use) is set in an entry corresponding to the processor unit which is participating in processing operation and logically separated, "10" (in waiting) is set in an entry corresponding to a processor unit which is able to operate and also logically separated and "00" (invalid) is set in an entry corresponding to a processor unit which is unable to operate. The logical processor address is a virtual address optionally assigned to the processor unit and the physical processor address is an actual physical address of the network.

It is assumed that the logical processor address of the sender processor unit 201 is "00000001", the physical processor address thereof is "00000000", the logical processor address of the receiver processor unit 203 is "00000009" and the physical processor address thereof is "00020002". It is also assumed that the logical processor address of the substitute receiver processor unit 205 is "00000004" and the physical processor address thereof is "00010000".

For transferring data from the sender processor unit 201 to the receiver processor unit 203, the processor unit 201 transmits a packet to which the logical processor address "00000001" as the sender logical address and the logical processor address "00000009" as the destination logical address are added. The network routers which have received the packet designate the destination logical address "00000009" and generate the request for obtaining the physical address corresponding to the destination logical address to the service processor 120. The table lookup circuit 121 of the service processor 120 retrieves a logical processor address "00020002" corresponding to the logical processor address "00000009" from the processor address translation table 122 and returns it to the requesting network router. Thus if the receiver processor unit 203 is normal, the packet transmitted from the processor unit 201 is received by the processor unit 203 on the route 210.

On the other hand, dynamic reconfiguration of the packet routing when a fault occurs is carried out as follows with the processor address translation table 122. On the processor address translation table 122, a processor unit corresponding to the entry in which the validity bit is "10" in the same class as the fault-detected processor unit is selected as the substitute receiver processor unit. The physical processor address corresponding to the logical processor address of the fault-detected processor unit is rewritten to the physical processor address of the selected processor unit and the validity bit of the selected entry is rewritten from "10" to "00" to invalidify it.

For example, if a fault occurs in the receiver processor unit 203, the receiver processor unit 203 designates the own logical processor address "00000009" and informs the fault interrupt to the service processor 120. The service processor 120 looks up the processor address translation table 122 and selects the processor unit 205 which has the logical processor address of "00000004" and the physical processor address of "00010000" as the substitute receiver processor unit, as the entry where the validity bit is "10" in the same class (001). The physical processor address "00020002" corresponding to the logical processor address "00000009" of the processor unit 203 in which a fault has occurred is rewritten to "00010000" and the validity bit of the selected entry is rewritten from "10" to "00" to invalidify it. Consequently, when the network router 204, which has received the packet after the system has been released from freezing, designates the destination logical address "00000009" and issues the physical address obtention request to the service processor 120, the table lookup circuit 121 of the service processor 120 retrieves the logical processor address "00010000" corresponding to the logical address "00000009" from the processor address translation table 122 and returns it to the network router 204. Thus the packet can be received at the substitute receiver processor unit 205 through the route 211.

Figure 3:
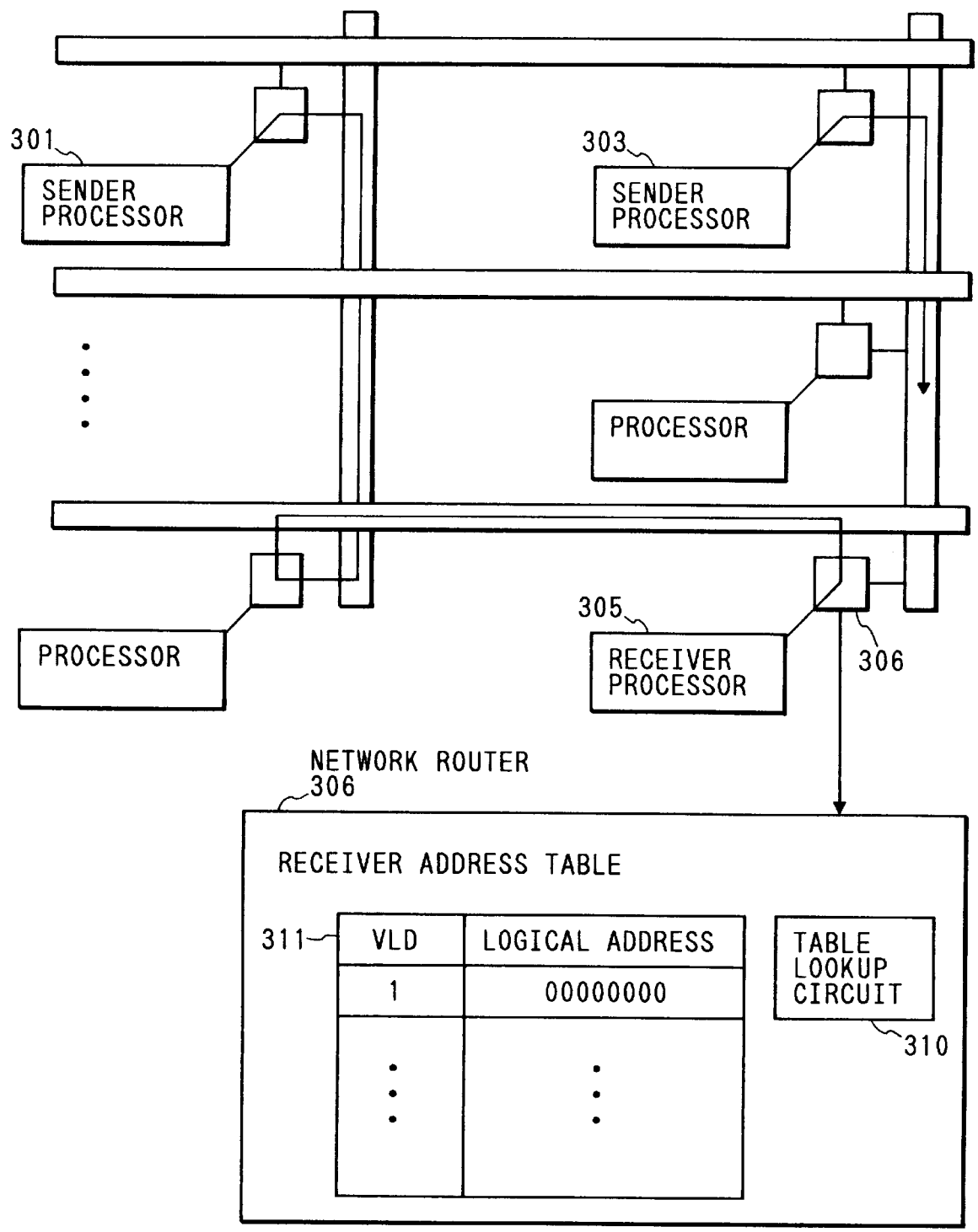
FIG. 3 is an illustration showing a configuration example of a receiver address table and the operation thereof.

FIG. 3 is a diagram illustrating a typical configuration example of the receiver address table provided in the network routers and its functions.

In FIG. 3, it is assumed that 301 and 303 are the sender processor unit and 305 is the receiver processor unit. The network router 306 of the receiver processor unit 305 is provided with the table lookup circuit 310 and the receiver address table 311. The entries of the receiver address table 311 respectively comprise the VLD bit for indicating validity or invalidity of the entry and the logical address where the sender logical address of the received packet is registered. Though the receiver address table only for the network router 306 is shown in FIG. 3, all network routers 102 contain this receiver address table.

When the packet transmitted from the sender processor unit 301 reaches the network router 306 of the receiver processor unit 305, the logical address (sender logical address) of the sender processor unit 301 added to the received packet is registered in the receiver address table 311 through the table lookup circuit 310 in the corresponding network router 306 and "1" is set in the VLD bit of the entry. When all packets from the corresponding sender processor unit 301 are fetched (reception is completed), the network router 306 rewrites the VLD bit of the entry to "0". In the table lookup circuit 310, when registration in one entry is completed, the entry pointer is pointed to the next entry address and, when the receiver address table 306 is fully occupies, the entry pointer is pointed at the heading of the entry of the low order address for which the VLD bit is "0".

When a fault occurs in the receiver processor unit 305, the receiver processor unit 305 informs the fault interrupt to the service processor. In response to this information, the service processor rewrites the processor address translation table as described in FIG. 2 and carries out dynamic reconfiguration of the packet routing. After this, the service processor reads the contents of the receiver address table 311 in the network router 306 connected to the fault-detected processor unit 305 through the table lookup circuit 310 and reports the packet re-sending request interrupt to the sender processor unit (301 in FIG. 3)corresponding to the logical address for which the VLD bit is "1" or reception of the packets is not completed.

In response to the packet re-sending request, the OS of the sender processor unit 301 instructs transmission of the packet under the same conditions as those set before the fault occurs without consciousness of the fault which has occurred in the receiver processor unit 305. Consequently, the packet re-sent from the sender processor unit 301 is received at the specified substitute receiver processor unit as described in FIG. 2.

On the other hand, in a case that the packet from the other sender processor unit 303 stays at the crossbar switch and does not yet reach the receiver processor unit 305 in FIG. 3, the logical address thereof is not registered in the receiver address table 311 of the network router 306. Accordingly, the packet re-sending request interrupt from the service processor is not reported to the sender processor unit 303 because the packet on the way is automatically received by the substitute receiver processor unit after freezing is canceled.

The packet re-sending request interrupt from the service processor is not reported to the sender processor unit corresponding to the logical address for which the VLD bit is "0" in the receiver address table 311, that is, reception of packets is finished before a fault occurs in the processor unit 305. As described later in FIG. 4, this is because the information to be copied by the service processor from the fault-detected processor unit to the substitute receiver processor unit contains the contents of normal packets.

Figure 5:
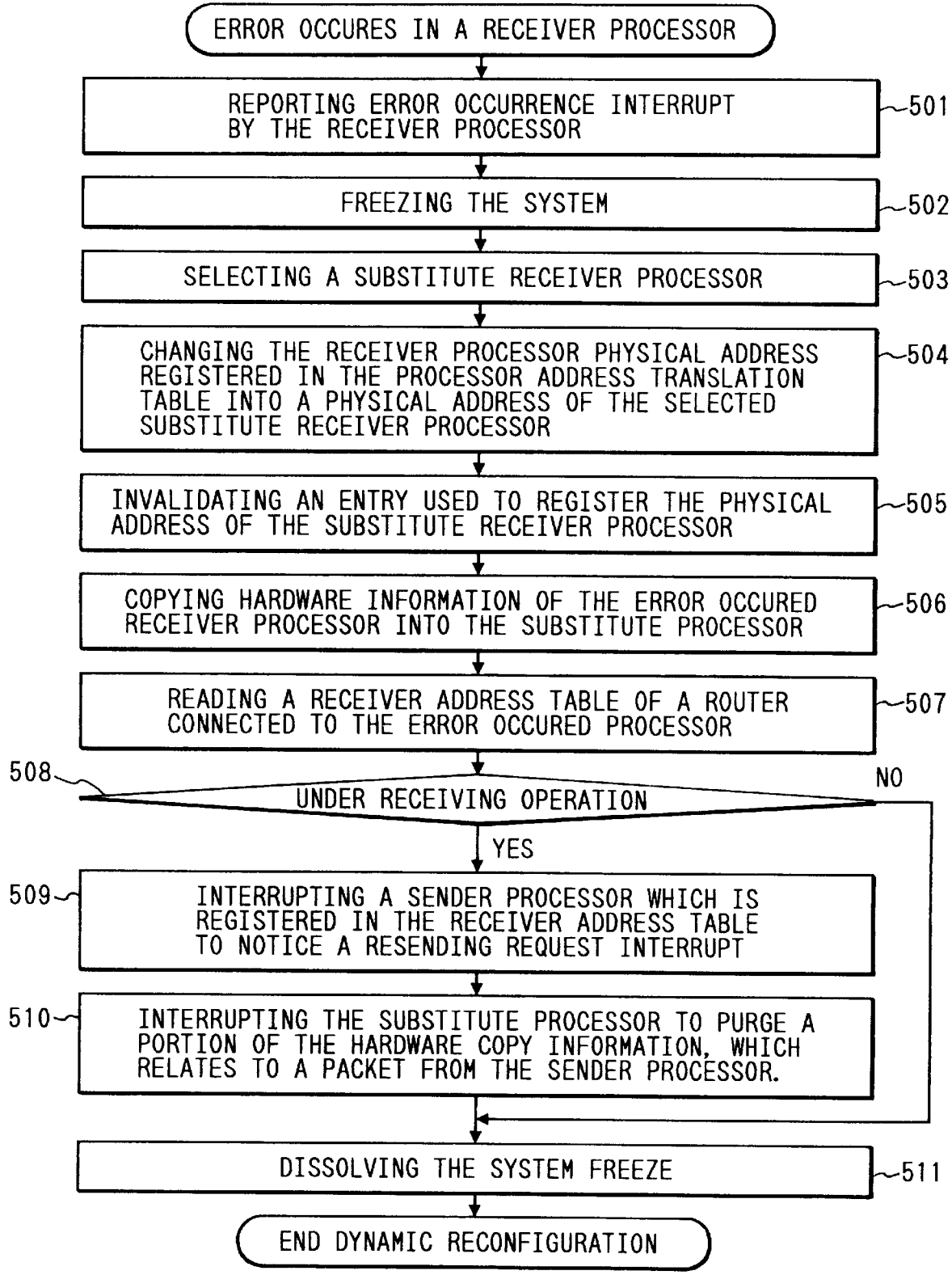
FIG. 5 is a processing flow chart for dynamic reconfiguration control of a service processor when a fault occurs.

FIG. 5 shows a general flow chart of the service processor from occurrence of a fault in a certain processor unit to resuming the processing by the substitute processor unit.

When a fault occurs in the receiver processor unit, the processor unit reports the fault interrupt to the service processor. (Step 501) When the service processor receives the fault report interrupt, the operation of the whole system is immediately freezed. (Step 502) As described in FIG. 2, an entry (in which a valid bit is "10") which is an object of the substitute processor unit in the same class is selected by referring to the processor address translation table (step 503), the physical processor address of the entry of the fault-detected receiver processor unit registered in the processor address translation table is rewritten to the physical processor address of the entry of the selected substitute processor unit (step 504), and the entry of the substitute processor unit is invalidated (the valid bit is "00") (step 505). After this, the hardware information of the receiver processor unit in which a fault occurs is copied in the substitute receiver processor unit. (Step 506)

Subsequently, the service processor reads the receiver address table in the network router connected to the receiver processor unit in which a fault has occurred (step 507) and whether the fault-detected receiver processor unit is receiving the packet is determined from the VLD bit. (Step 508) In the case that the fault-detected receiver processor unit is receiving the packet (VLD bit is "1"), the packet re-sending request interrupt is reported to the sender processor unit of the logical address registered in the corresponding entry of the receiver address table (step 509), a receiving packet cancel interrupt of the hardware information of the fault-detected processor unit which is copied in step 506 is reported to the substitute receiver processor unit (step 510) to cancel freezing of the system (step 511). In the case the fault-detected processor unit is not receiving the packet (VLD bit is "0"), the system is released from freezing without carrying out the processing in steps 509 and 510.

Figure 6:
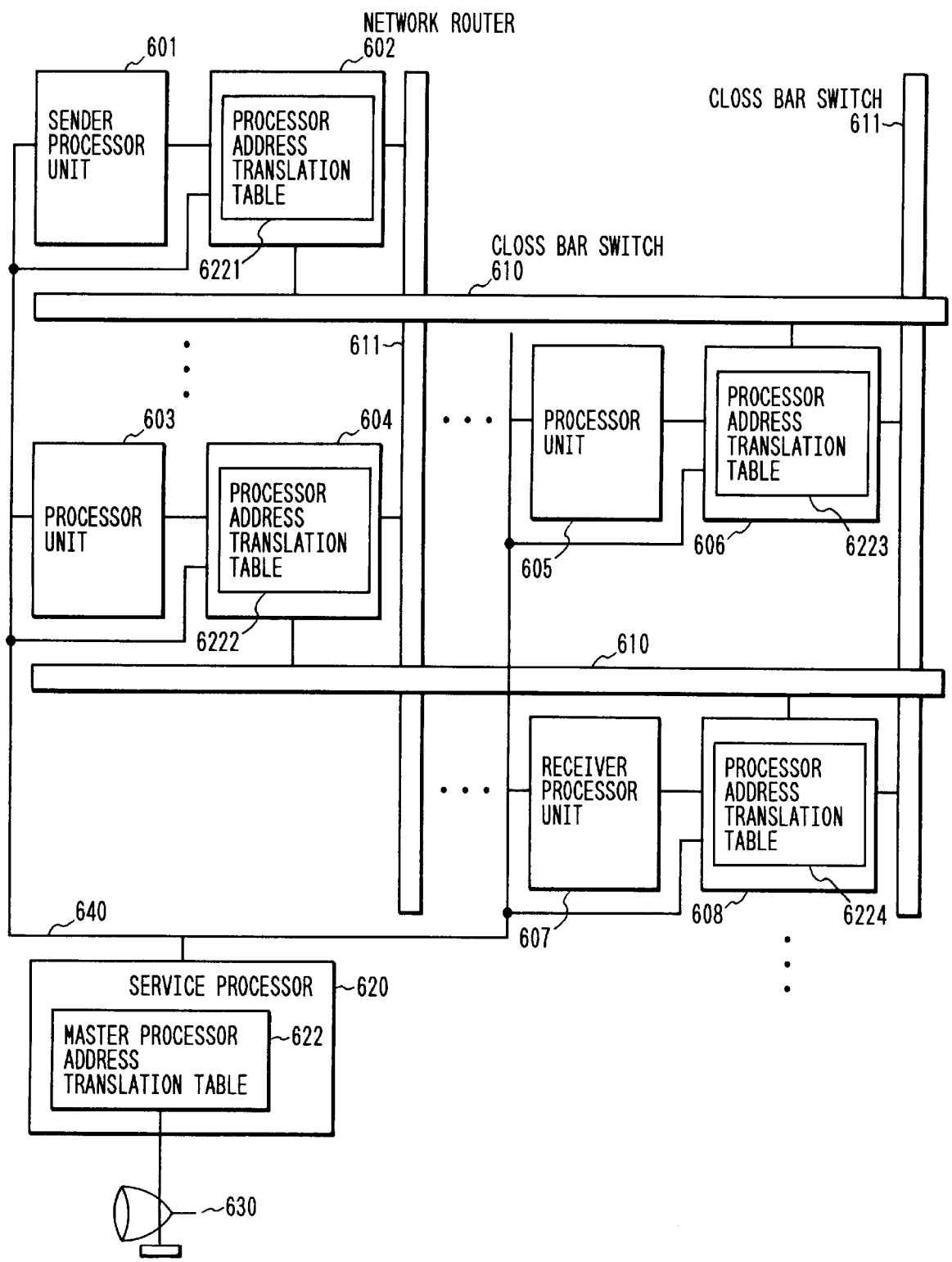
FIG. 6 is a block configuration diagram of a second embodiment of the present invention.

FIG. 6 is a block configuration diagram of a second embodiment of the present invention and the processor address translation tables 6221 to 6224 are provided for respective network routers 602, 604, 606 and 608. Though omitted in FIG. 6, the network routers 602, 604, 606 and 608 have the receiver address table described in FIG. 3 as in the first embodiment, in addition to the processor address translation tables.

The service processor 620 has a master processor address translation table 622 and, when the system is started, the contents of the master processor address translation table 622 are distributed to the signal line 640 to initialize the processor address translation tables 6221 to 6224. When a fault occurs in a certain processor unit, the service processor 620 rewrites the master processor address translation table 622 as described in FIG. 2 and sets again the contents of the changed master processor address translation table 622 in the processor address translation tables 6221 to 6224 of the respective network routers 602, 604, 606 and 608. Agreement of the processor address translation tables in respective network routers is thus maintained.

According to the configuration shown in FIG. 6, when the network routers 602, 604, 606 and 608 receive a packet, the network routers are able to obtain respective physical addresses corresponding to the destination logical addresses while referring to their own address translation tables 6221, 6222, 6223 and 6224 and need not issue the physical address obtention request to the service processor 620. The service processor also need not respond to the physical address obtention request.

Having described about an embodiment of the present invention, the packet transmission route is not limited to the crossbar switch and other desired means can be used. One or a plurality of processor units of processor unit groups which form the parallel processing system may be additionally provided with the function of the service processor and used instead of the service processor when the service processor fails.

According to the present invention, all processor units connected to the network are controlled with the logical addresses and the physical addresses and therefore a target processor unit can be easily separated from the network and dynamic reconfiguration processing can be quickly carried out, thereby the availability and the maintainability can be substantially improved.

The processor address translation table in which the correspondence of the logical addresses and the physical addresses of the processor units can be centrally controlled by the monitoring processor which monitors the condition of the system or dividedly controlled by the network routers corresponding to the respective processor units. In case of the central control by the monitor processor, though maintenance is simple, the network routers are required to issue the request for participation each time and this control is suited to a system comprising a small number of processor units. On the other hand, the divided control by the network routers does not require the request for inquiry to the monitor processor and is therefore effective for a system which comprises a large number of processor units.

Since the network routers control the identification bits which indicate whether the matching processor units are receiving the packets and the correspondence to the logical addresses of the sender processor units of the packets, the network routers carry out re-sending only for the sender processor unit in which a fault has occurred during reception. The packets which are on the way and do not yet reach the receiver side will not be re-sent even though the processor units are dynamically re-configured and will be sent to the receiver processor units which are newly assigned. Therefore the re-sending processing in the OS of the processor units is simplified the overhead for processing can be remarkably reduced.

What is claimed is:

1. A communication control method for a parallel processing system having a plurality of processor units which are connected with a network through network routers for data transfer to be carried out by transmission and reception of packets between said processor units, comprising:

a processor address translation table in which correspondence between logical addresses and physical addresses of said processor units is provided in a certain specific processor unit of said plurality of processor units or a monitor processor which is separately provided to monitor a condition of said parallel processing system;

a packet sending processor unit for transmitting a packet to which its own processor unit address and a logical address as a receiver processor unit address are added;

a network router for receiving said packet, generating a request to said monitor processor to obtain a physical address corresponding to a logical address of a receiver processor unit and selecting a route of the network in accordance with said physical address, wherein a certain specific processor unit in which a fault occurs is logically separated from the network by changing the correspondence between the logical addresses and the physical addresses of the processor address translation table and a processor unit is selected as the substitute processor unit from a plurality of valid processors indicated in the processor address translation table, each network router is provided with a receiver address table in which correspondence between identification bits which indicate whether or not a processor unit connected to said network router is receiving and processing packets and logical addresses of sender processor units of said packets is registered, and the monitor processor reads the receiver address table of a network router connected to the fault-detected processor unit when a fault occurs in the receiver processor unit and, if one of said identification bits indicates that the processor unit is receiving and processing packets, informs resuming of packet transmission to the packet sending processor unit of the corresponding logical address.

2. A communication control method for a parallel processing system having a plurality of processor units which are connected with a network through network routers for data transfer to be carried out by transmission and reception of packets between said processor units, wherein:

a processor address translation table in which correspondence between logical addresses and physical addresses of said processor units which form said parallel processing system is provided in each of network routers;

a packet sending processor unit for transmitting a packet to which its own processor unit address and a logical address as a receiver processor unit address are added;

a network router which receives said packet, obtains a physical address corresponding to a logical address of a receiver processor unit by referring to said processor address translation table and selects a route of the network in accordance with said physical address, wherein a certain specific processor unit is logically separated from the network by changing the correspondence between the logical addresses and the physical addresses of the processor address translation table and a processor unit is selected as the substitute processor unit from a plurality of valid processors indicated in the processor address translation table, each network router is provided with a receiver address table in which correspondence between identification bits which indicate whether or not a processor unit connected to said network router is receiving and processing packets and logical addresses of sender processor units of said packets is registered, and the monitor processor reads the receiver address table of a network router connected to the fault-detected processor unit when a fault occurs in the receiver processor unit and, if one of said identification bits indicates that the processor unit is receiving and processing packets, informs resuming of packet transmission to the packet sending processor unit of the corresponding logical address.

* * * * *

UNITED STATES PATENT AND TRADEMARK OFFICE
CERTIFICATE OF CORRECTION

PATENT NO.  : 5,808,886
DATED       : September 15, 1998
INVENTOR(S) : Karou Suzuki It is certified that error appears in the above-indentified patent and that said Letters Patent is hereby corrected as shown below:

`Title page, item [57]`
Abstract of the Disclosure, last line, after "dynamically" insert -- set. --

Signed and Sealed this

Ninth Day of March, 1999

Attest:

Attesting Officer

Q. TODD DICKINSON

Acting Commissioner of Patents and Trademarks